United States Patent Office 3,440,274
Patented Apr. 22, 1969

3,440,274
TRIMETHOXYPHENYLALKYLAMINES AND THEIR CARBOALKOXY DERIVATIVES
Frank P. Palopoli, Glenside, Dominic Donald Micucci, Havertown, and Paul D. Rosenstock, Philadelphia, Pa., assignors to Richardson-Merrell Inc., New York, N.Y., a corporation of Delaware
No Drawing. Filed Oct. 21, 1965, Ser. No. 500,272
Int. Cl. C07c 93/00, 93/14
U.S. Cl. 260—471    6 Claims

ABSTRACT OF THE DISCLOSURE

The preparation of allyl substituted trimethoxyphenylalkylamines and derivatives is described. An illustrative compound is N-methyl-α-allyl-3,4,5-trimethoxyphenethylamine. These compounds have antihypertensive activity in animals.

---

This invention relates to new and novel compounds having useful pharmacological properties. This invention also provides methods for the preparation of these new compounds.

The compounds of this invention are allyl substituted trimethoxyphenylalkylamines, their alkylamino derivatives, and their carboalkoxy derivatives. Thus the compounds of this invention may be represented by the general formula:

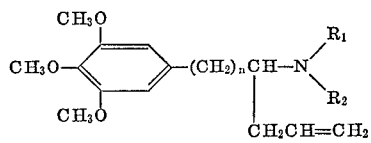

wherein $R_1$ and $R_2$ are individually selected from the group consisting of hydrogen, lower alkyl, and carboalkoxy, and $n$ stands for one of the whole numbers 0, 1, or 2. When $n$ is 1 or 2 the allyl group may be attached to the alpha- or beta-carbon atoms.

In the above formula, either one or both of the symbols $R_1$ and $R_2$ can represent hydrogen. Lower alkyl is exemplified by groups such as methyl and ethyl while the carboalkoxy groups are exemplified by carbomethoxy or carboethoxy. The compounds represented by the formula wherein $R_1$ and $R_2$ are selected from hydrogen or lower alkyl are basic compounds which form acid addition salts with inorganic or organic acids. Thus they form pharmaceutically acceptable organic and inorganic salts with pharmaceutically acceptable organic and inorganic acids. These acids may be selected from hydrochloride, hydrobromide, sulfate, nitrate, phosphate, benzenesulfonate, toluenesulfonate, acetate, citrate, maleate, tartrate, salicylate, ascorbate, and the like.

The novel α-allyl substituted primary amines may be prepared by the Hoffman degradation reaction of an amide containing one carbon atom more than the resulting product, i.e.

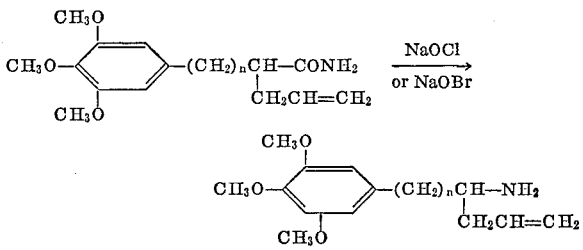

The Hoffman degradation reaction generally is carried out by dissolving the amide in a very slight excess of cold (−5 to 5° C.) aqueous hypohalite solution followed by rapid warming (30 to 70° C.) for fifteen minutes to two hours.

The novel β-allyl substituted derivatives are conveniently prepared by reducing the corresponding primary amide with lithium aluminum hydride, i.e.

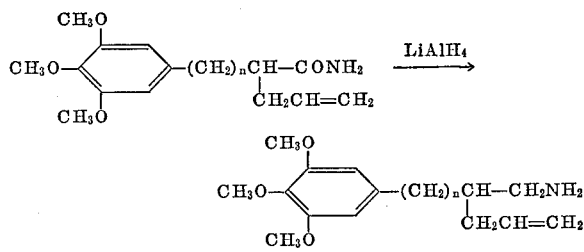

Alternatively a β-allyl substituted derivative may be prepared by the lithium aluminum hydride reduction of the corresponding allyl benzylcyanide, i.e.

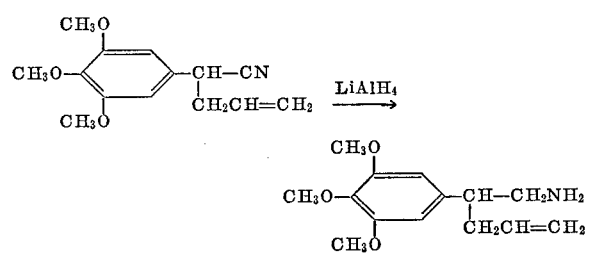

The lithium aluminum hydride reductions take place in the presence of an organic solvent such as ethyl ether or tetrahydrofuran and take place smoothly at the reflux temperature of the solvent. After refluxing for two to four hours, the resulting organo-metallic complex is decomposed by the cautious addition of water. After separating the organic layer, the desired product is isolated in the conventional manner.

The novel α-allyl substituted carbamates may be prepared by a modification of the Hoffman degradation reaction in which the reaction is carried out in methanol to give the novel methylcarbamates, i.e.

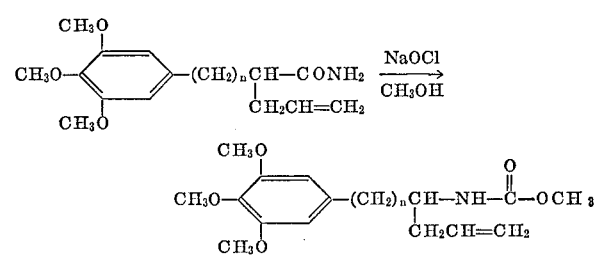

In certain cases, because of poor yields, it may be advantageous to use a modification of the above Hoffman degradation in preparing the primary amines which consists of carrying out the reaction in methanolic solution to give the novel methylcarbamate derivatives. Alkaline hydrolysis of the carbamate derivatives gives the desired primary amines. Generally the hypohalite solution is added rapidly with thorough mixing to a methanolic solution of the amide. Warming the solution completes the reaction in ten to twenty minutes from which the desired carbamate is readily obtained. Subsequent hydrolysis of the carbamate by refluxing with 40 percent sodium hydroxide solution for one to three hours yields the desired amines.

Alternatively, the carbamates may be prepared by the reaction of an alkyl chlorocarbonate with a primary amine, i.e.

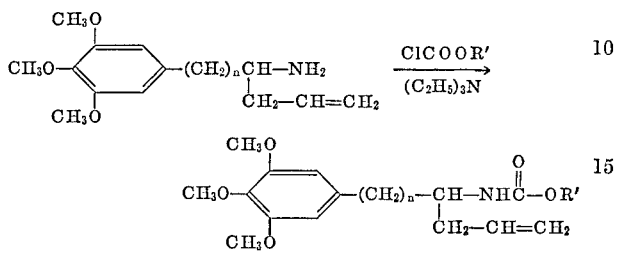

wherein R′ may be methyl or ethyl.

The carbamates, in addition to having useful pharmacological properties of their own, are useful as intermediates for the preparation of the corresponding primary and secondary amines. Alkaline hydrolysis of the carbamates yields the corresponding primary amine, while lithium aluminum hydride reduction yields the corresponding N-methyl derivatives, i.e.

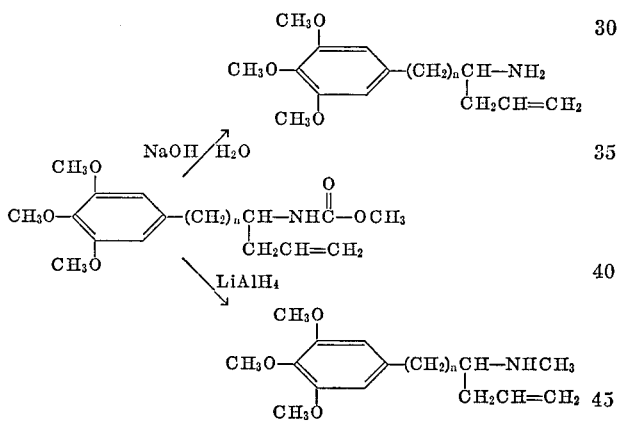

N-ethylation may be accomplished by first reacting a primary amine with acetyl chloride and reducing the resulting N-acetyl derivative with lithium aluminum hydride to give the desired N-ethyl derivative, e.g.

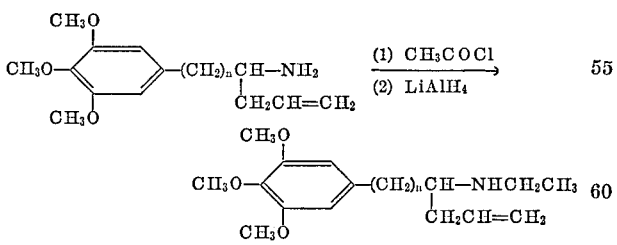

The acid addition salts of the product of this invention may be readily prepared by the addition of mineral acid or organic acids to the amine in a suitable solvent such as ethanol, acetone, butanone, ether, et cetera.

The new compounds of this invention have hypotensive activity in various species of experimental animals such as the rat, cat, and dog at doses dissociated from untoward effects. Activity was observed in both hypertensive and normotensive animals by both the intravenous and oral routes of administration. Activity was maintained for twelve to twenty-four hours in both rats and dogs following oral administration.

Preliminary investigations into the mechanism of action of the hypotensive activity indicate that these compounds, unlike some therapeutic agents, do not appear to be acting by such undesirable mechanisms as peripheral sympathetic blockade or a direct cardiac depressant action. This type of compound appears to have an effect on the vascular smooth muscle which appears to be a major component of its hypotensive action. Effective dosage levels range from 0.2 to 4.0 milligrams per kilogram of body weight.

EXAMPLE 1

α-Allyl-2-(3,4,5-trimethoxyphenyl)ethylamine

Bromine (95.2 grams) was added in fifteen minutes to a cooled solution of sodium hydroxide (143 grams) in 1 liter of water. The resulting solution was stirred an additional thirty minutes—then solid 2-(3,4,5-trimethoxybenzyl)-4-pentenoamide (166 grams) was added all at once. The reaction mixture was stirred at 0° C. for five hours, allowed to warm to room temperature, and after standing overnight, heated to 70° C. for one hour, cooled and extracted with three 200 milliliter portions of ether. The combined ether extracts were dried over anhydrous $MgSO_4$. The solvent was removed and the residual oil distilled to give the desired α-allyl-2-(3,4,5-trimethoxyphenyl)ethylamine as a pale yellow oil, boiling at 157 to 160° C. at 0.3 mm. A solution of the oil in ether was treated with anhydrous chloride to give α-allyl-2-(3,4,5-trimethoxyphenyl)ethylamine hydrochloride as a white solid melting at 212 to 214° C.

EXAMPLE 2

Ethyl-(3,4,5-trimethoxy-α-allylphenethyl)carbamate

To a cooled solution (0° C.) of 12.5 grams of α-allyl-3,4,5-trimethoxyphenethylamine and 5.0 grams of triethylamine in 300 milliliters of ether was added dropwise to 100 milliliters of an ether solution containing 5.4 grams of ethylchlorocarbonate with the formation of a white precipitate. The reaction mixture was refluxed for five hours, cooled, diluted with water, and washed with 10 percent sodium hydroxide solution, 10 percent hydrochloric acid solution, and with water and dried over anhydrous sodium sulfate.

The solvent was removed and the solid residue was crystallized from a mixture of benzene and petroleum ether to give the desired ethyl-(3,4,5-trimethoxy-α-allylphenethyl)carbamate as a white solid melting at 73 to 74° C.

EXAMPLE 3

N-methyl-α-allyl-3,4,5-trimethoxyphenethylamine

Ethyl - (3,4,5 - trimethoxy-α-allylphenethyl)carbamate (25.7 grams) in 300 milliliters of tetrahydrofuran was added to a suspension of lithium aluminum hydride (4.6 grams) in 200 milliliters of tetrahydrofuran. The stirred mixture was refluxed for seven hours, and after cooling, decomposed by the dropwise addition of 5 milliliters of water, 5 milliliters of 15 percent sodium hydroxide solution, and 20 milliliters of water. The reaction mixture was stirred an additional thirty minutes and filtered. The filter cake was washed with three 100 milliliter portions of ether and the filtrate dried over anhydrous potassium carbonate. The solvent was removed and the residual oil distilled to give the desired N-methyl-α-allyl-3,4,5-trimethoxyphenethylamine as a pale yellow oil, boiling at 123 to 132° C. at 0.11 to 0.15 mm.

A solution of the oil in ether was treated with anhydrous hydrogen chloride to give N-methyl-α-allyl-3,4,5-trimethoxyphenethylamine hydrochloride which crystallized from butanone as a white solid with a melting point of 140 to 142° C.

EXAMPLE 4

N-ethyl-α-allyl-3,4,5-trimethoxyphenethylamine

A solution of 5-(3,4,5-trimethoxyphenyl)-4-acetamido pentene (26.7 grams) in 200 milliliters of tetrahydrofuran was added with stirring and cooling to a suspension of lithium aluminum hydride (5.2 grams) in 200 milliliters of tetrahydrofuran. The reaction mixture was stirred at room temperature for one hour and then refluxed for twelve hours, and after cooling, cautiously decomposed by the dropwise addition of 6 milliliters of water, 6 milliliters of 15 percent sodium hydroxide solution, and an additional 18 milliliters of water. After standing overnight, the mixture was filtered and the filter cake washed well with ether and tetrahydrofuran. The filtrate was dried over $Na_2CO_3$ and the solvent removed. The residual oil was distilled to give the desired N-ethyl-α-allyl-3,4,5-trimethoxyphenethylamine as a viscous oil boiling at 130 to 135° C. at 0.08 mm.

A solution of the oil in ether was treated with anhydrous hydrogen chloride to give N-ethyl-α-allyl-3,4,5-trimethoxyphenethylamine hydrochloride as a white solid melting at 144 to 146° C.

EXAMPLE 5

Methyl-(3,4,5-trimethoxy-α-allylphenethyl)carbamate

When methyl chlorocarbonate replaced ethyl chlorocarbonate in the procedure of Example 2, there was obtained methyl - (3,4,5 - trimethoxy - α - allylphenethyl) carbamate as a white solid melting at 68 to 69° C.

EXAMPLE 6

Allyl-3,4,5-trimethoxybenzylamine

When 2-(3,4,5-trimethoxyphenyl) - 4 - pentenoamide replaced the 2 - (3,4,5-trimethoxybenzyl)-4-pentenoamide in the procedure of Example 1, there was obtained α-allyl-3,4,5-trimethoxybenzylamine hydrochloride as a white crystalline solid which melted at 204° C. after recrystallization from methylethyl ketone.

EXAMPLE 7

Methyl-(3,4,5-trimethoxy-allyl-benzyl)carbamate

When α-allyl-3,4,5-trimethoxyphenethylamine was replaced with allyl-3,4,5-trimethoxybenzylamine and ethylchlorocarbonate was replaced with methylchlorocarbonate in the procedure of Example 2, the desired methyl-(3,4,5-trimethoxy-allyl-benzyl)carbamate was obtained.

EXAMPLE 8

N-methyl-allyl-3,4,5-trimethoxybenzylamine

When ethyl - (3,4,5 - trimethoxy - α - allylphenethyl) carbamate was replaced with methyl - (3,4,5 - trimethoxyallylbenzyl)carbamate in the procedure of Example 3, the desired N - methylallyl-3,4,5-trimethoxybenzylamine was obtained.

EXAMPLE 9

β-allyl-3,4,5-trimethoxyphenethylamine

To a stirred suspension of 6.0 grams of lithium aluminum hydride in 100 milliliters of tetrahydrofuran was added, dropwise, a solution of 18.5 grams of 2-(3,4,5-trimethoxyphenyl)pent-4-enonitrile in 50 milliliters of tetrahydrofuran. The reaction mixture was heated to reflux for two hours and after cooling cautiously decomposed by the dropwise addition of 6 milliliters of water, 6 milliliters of 10 percent sodium hydroxide solution, and an additional 18 milliliters of water. The reaction mixture was filtered and the filter cake washed well with 200 milliliters of tetrahydrofuran and then with 200 milliliters of ether. The solvent was evaporated under reduced pressure and the residue dissolved in 200 milliliters of ether and washed with water. The ether layer was extracted with two 100 milliliter portions of 10 percent HCl and neutralized with solid sodium carbonate. The oil which separated was taken up in ether, the ether extracts dried and the solvent removed. The residual oil was distilled to give the desired β-allyl-3,4,5-trimethoxyphenethylamine as a water clear oil boiling at 130 to 134° C. at 0.16 mm. A solution of the oil in ether was treated with anhydrous hydrogen chloride to give β-allyl-3,4,5-trimethoxyphenethylamine hydrochloride as a white solid melting at 162 to 164° C.

EXAMPLE 10

Methyl-(3,4,5-trimethoxy-β-allylphenethyl)carbamate

When α - allyl - 3,4,5 - trimethoxyphenethylamine was replaced with β - allyl - 3,4,5 - trimethoxyphenethylamine and ethylchlorocarbonate was replaced with methylchlorocarbonate in the procedure of Example 2, the desired methyl - (3,4,5 - trimethoxy - β - allylphenethyl) carbamate was obtained.

EXAMPLE 11

N-methyl-β-allyl-3,4,5-trimethoxyphenethylamine

When ethyl - (3,4,5 - trimethoxy - α - allylphenethyl) carbamate was replaced with methyl-(3,4,5-trimethoxy-β-allylphenethyl)carbamate in the procedure of Example 3, the desired N-methyl - β - allyl - 3,4,5 - trimethoxyphenethylamine hydrochloride was obtained as a white solid melting at 199 to 201° C.

EXAMPLE 12

β-Allyl-γ-(3,4,5-trimethoxyphenyl)propylamine

When 5 - (3,4,5 - trimethoxyphenyl) - 4 - acetamido pentene was replaced with α-allyl - [β-(3,4,5-trimethoxyphenyl)]-propionamide in the procedure of Example 4, there was obtained the desired β-allyl-[γ-(3,4,5-trimethoxy-phenyl)]-propylamine as an oil boiling at 140° C. at 0.25 mm. A solution of the oil in ether was treated with anhydrous hydrogen chloride to give β-allyl-[γ-(3, 4,5-trimethoxyphenyl)]-propylamine hydrochloride as a white solid melting at 72 to 74° C.

EXAMPLE 13

Methyl-[β-allyl-γ-(3,4,5-trimethoxyphenyl)-propyl]-carbamate

When α-allyl - 3,4,5 - trimethoxyphenethylamine was replaced by β-allyl - γ - (3,4,5-trimethoxyphenyl)-propylamine and ethylchlorocarbonate was replaced by methylchlorocarbonate in the procedure of Example 2, the desired methyl - β - allyl - γ - (3,4,5-trimethoxyphenyl)-propyl]-carbamate was obtained.

EXAMPLE 14

N-methyl-[β-allyl-γ-(3,4,5-trimethoxyphenyl)-propyl]-amine

When ethyl-(3,4,5 - trimethoxy - γ - allylphenethyl)-carbamate was replaced with methyl-[β - allyl - γ - (3,4,5-trimethoxyphenyl)-propylcarbamate in the procedure of Example 3, the desired N-methyl - [β - allyl - γ - (3,4, 5-trimethoxyphenyl)-propyl]-amine was obtained.

What is claimed is:

1. A compound of the group consisting of those having the general formula:

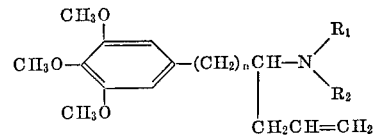

in which $R_1$ and $R_2$ are selected from the group consisting of hydrogen, lower alkyl, and carbo-lower-alkoxy, $n$ is one of the whole numbers 0, 1, or 2, and when $n$ is 1 or 2, the allyl group may be attached to the alpha- or beta-carbon atoms.

2. N - methyl - α - allyl - 3,4,5 - trimethoxyphenethylamine.

3. α - Allyl - 2 - (3,4,5 - trimethoxyphenyl)ethylamine.
4. Ethyl - (3,4,5 - trimethoxy - α - allylphenethyl)-carbamate.
5. N - ethyl - α - allyl - 3,4,5 - trimethoxyphenethylamine.
6. Methyl - (3,4,5 - trimethoxy - α - allylphenethyl)-carbamate.

References Cited

UNITED STATES PATENTS 3,128,309   4/1964   Wasson et al. _____ 260—570.8

OTHER REFERENCES

Chemical Abstracts, article by Friedman et al., vol. 59 (1963) pp. 497C to 498B relied on.

Chemical Abstracts, article by Schwachhofer et al., vol. 57 (1962) pp. 12557G to 12559D relied on.

LORRAINE A. WEINBERGER, *Primary Examiner.*

L. ARNOLD THAXTON, *Assistant Examiner.*

U.S. Cl. X.R.

260—570.8; 167—65